US011230379B2

(12) United States Patent
Jackson et al.

(10) Patent No.: US 11,230,379 B2
(45) Date of Patent: Jan. 25, 2022

(54) ORGANIZING PLACES OF INTEREST IN-FLIGHT

(71) Applicant: Betria Interactive, LLC, Irvine, CA (US)

(72) Inventors: Duncan Charles Jackson, Walnut Creek, CA (US); Boris Veksler, Irvine, CA (US); David Neil Dyrnaes, Laguna Beach, CA (US)

(73) Assignee: Betria Interactive, LLC, Irvine, CA (US)

( * ) Notice: Subject to any disclaimer, the term of this patent is extended or adjusted under 35 U.S.C. 154(b) by 0 days.

(21) Appl. No.: 16/368,842

(22) Filed: Mar. 28, 2019

(65) Prior Publication Data

US 2020/0307795 A1 Oct. 1, 2020

(51) Int. Cl.
*B64D 11/00* (2006.01)
*G06F 3/048* (2013.01)
(Continued)

(52) U.S. Cl.
CPC ...... *B64D 11/0015* (2013.01); *G06F 3/04845* (2013.01); *G06F 3/04847* (2013.01);
(Continued)

(58) Field of Classification Search
CPC . B64D 11/0015; G06F 3/048; G06F 3/04847; G06F 3/1423; G06F 2203/04806;
(Continued)

(56) References Cited

U.S. PATENT DOCUMENTS 6,661,353 B1 * 12/2003 Gopen ............... B64D 11/0015
340/973
6,850,837 B2 2/2005 Paulauskas et al.
(Continued)

FOREIGN PATENT DOCUMENTS

KR 101518400 B1 5/2015
WO 2014043402 A2 3/2014

OTHER PUBLICATIONS

Etihad Airways; Etihad Airways awarded for best IFE/connectivity launch by an airline 2016; Anonymous. Mid-East.Info [Cairo] Apr. 7, 2016; Retrieved from Proquest.
(Continued)

*Primary Examiner* — Mahelet Shiberou
(74) *Attorney, Agent, or Firm* — Betria Interactive, LLC

(57) ABSTRACT

A time-sensitive, data reduction system is described. According to an aspect of the system, a method is disclosed that comprises: receiving at least a portion of an airline-specific dataset, wherein the airline-specific dataset comprises a plurality of location records, wherein each location record comprises a point of interest (POI) and a unique rank, wherein the POI is defined by unique geographic identifier; determining a current position of the aircraft; and based on the current position and based on the unique rank of each of the plurality of location records, controlling, at a passenger display in the aircraft, a presentation of a map and a plurality of POI indicators associated with a highly-ranked subset of the plurality of location records. According to another aspect of the system, a plurality of servers are used provide relevant location-related content to an aircraft passenger.

20 Claims, 7 Drawing Sheets

(51) Int. Cl.
*G06F 3/0484* (2013.01)
*H04L 29/08* (2006.01)
*G06F 3/14* (2006.01)

(52) U.S. Cl.
CPC ............ *G06F 3/1423* (2013.01); *H04L 67/12* (2013.01); *G06F 2203/04806* (2013.01)

(58) Field of Classification Search
CPC ... G06F 3/04845; H04L 67/12; G01C 21/343; G01C 21/3476; G01C 21/3438
See application file for complete search history.

(56) References Cited

U.S. PATENT DOCUMENTS

| | | | |
|---|---|---|---|
| 7,280,134 B1 | 10/2007 | Henderson et al. | |
| 7,741,978 B2 | 6/2010 | Becker | |
| 7,777,718 B2 | 8/2010 | Franko et al. | |
| 7,945,934 B2 | 5/2011 | Margis et al. | |
| 7,984,190 B2 | 7/2011 | Rhoads | |
| 8,078,163 B2 | 12/2011 | Lemond et al. | |
| 8,806,521 B2 | 8/2014 | Keen et al. | |
| 8,954,860 B1* | 2/2015 | Hands ................ | G01C 21/3682 715/738 |
| 8,972,598 B2 | 3/2015 | Heron et al. | |
| 9,061,209 B2 | 6/2015 | Bieler | |
| 9,146,129 B1* | 9/2015 | Furio ................. | G01C 21/3679 |
| 9,367,217 B2 | 6/2016 | Moore, Jr. | |
| 9,689,707 B1* | 6/2017 | Derderian ............ | G01C 23/005 |
| 9,706,242 B2 | 6/2017 | Dame et al. | |
| 9,734,722 B1 | 8/2017 | Markey et al. | |
| 9,938,014 B2 | 4/2018 | Everhart et al. | |
| 2003/0078035 A1* | 4/2003 | Sheha ............... | H04L 29/12066 455/414.1 |
| 2003/0115278 A1* | 6/2003 | Goker .................. | H04L 29/06 709/207 |
| 2003/0192052 A1 | 10/2003 | Frisco et al. | |
| 2005/0091086 A1 | 4/2005 | Moore | |
| 2005/0122236 A1 | 6/2005 | Brauer et al. | |
| 2005/0278753 A1* | 12/2005 | Brady, Jr. ............... | G06F 16/95 725/76 |
| 2007/0143345 A1* | 6/2007 | Jones .................... | G06F 16/444 |
| 2008/0052168 A1* | 2/2008 | Peters ................ | G06Q 30/0267 705/14.53 |
| 2009/0094257 A1* | 4/2009 | Nissen .............. | G06F 16/24578 |
| 2009/0094635 A1 | 4/2009 | Aslin et al. | |
| 2009/0228196 A1* | 9/2009 | Raab ....................... | G01C 21/26 701/532 |
| 2010/0060739 A1 | 3/2010 | Salazar | |
| 2012/0009951 A1 | 1/2012 | Poland | |
| 2012/0095675 A1* | 4/2012 | Tom ..................... | G01C 21/343 701/425 |
| 2012/0232791 A1* | 9/2012 | Sterkel ................... | H04H 20/62 701/454 |
| 2013/0006521 A1* | 1/2013 | Needham ........... | G01C 21/3476 701/426 |
| 2013/0097162 A1* | 4/2013 | Corcoran ................ | G06F 16/29 707/724 |
| 2013/0212065 A1 | 8/2013 | Rahnama | |
| 2014/0247348 A1 | 9/2014 | Moore, Jr. et al. | |
| 2015/0233717 A1* | 8/2015 | Satti ...................... | G01C 21/00 701/438 |
| 2015/0261844 A1* | 9/2015 | Ramalho ................ | H04L 67/306 707/749 |
| 2016/0059954 A1 | 3/2016 | Fagan et al. | |
| 2017/0108348 A1* | 4/2017 | Hansen .................. | H04W 4/44 |
| 2017/0206201 A1 | 7/2017 | Chidlovskii | |
| 2018/0112995 A1* | 4/2018 | Bortolussi .......... | G01C 21/3679 |
| 2018/0150880 A1* | 5/2018 | O'Driscoll .............. | H04W 4/02 |
| 2018/0234707 A1* | 8/2018 | Pujia .................. | H04N 21/4415 |
| 2018/0260916 A1 | 9/2018 | Zaltzman et al. | |
| 2018/0336203 A1 | 11/2018 | Choksi et al. | |
| 2021/0124466 A1* | 4/2021 | Hoang .................. | G06F 3/0482 |

OTHER PUBLICATIONS

Rockwell Collins; Rockwell Collins' PAVES seat-centric IFE makes airline debut; Biman Bangladesh Airlines takes delivery of new 737—every seat equipped with new easy-to-use, easy-to-maintain, and reliable IFE; M2 Presswire Dec. 1, 2015; Retrieved from Proquest.
Akl et al.; Key factors in designing in-flight entertainment systems; In Recent Advances in Aircraft Technology. InTech, 2012; Ahmed Aki, Thierry Gayraud, Pascal Berthou; 2012; Retrieved at https://www.intechopen.com/download/pdf/28816.
Flyover Country; A mobile app for geoscience; University of Minnesota, National Science Foundation; Flyover Country Inc.; Mar. 12, 2019; Retrieved at https://flyovercountry.io/.
International Search Report and Written Opinion for PCT/US2020/024455 dated Jul. 17, 2020 (10 pages).

* cited by examiner

1200

ORGANIZING PLACES OF INTEREST IN-FLIGHT

BACKGROUND

Aircraft passengers may have limited opportunities to receive live information. For example, aircraft entertainment may include replaying stored media content or pre-recorded broadcasts so that, once airborne, passengers may be entertained during their flight.

DETAILED DESCRIPTION

Figure 1:
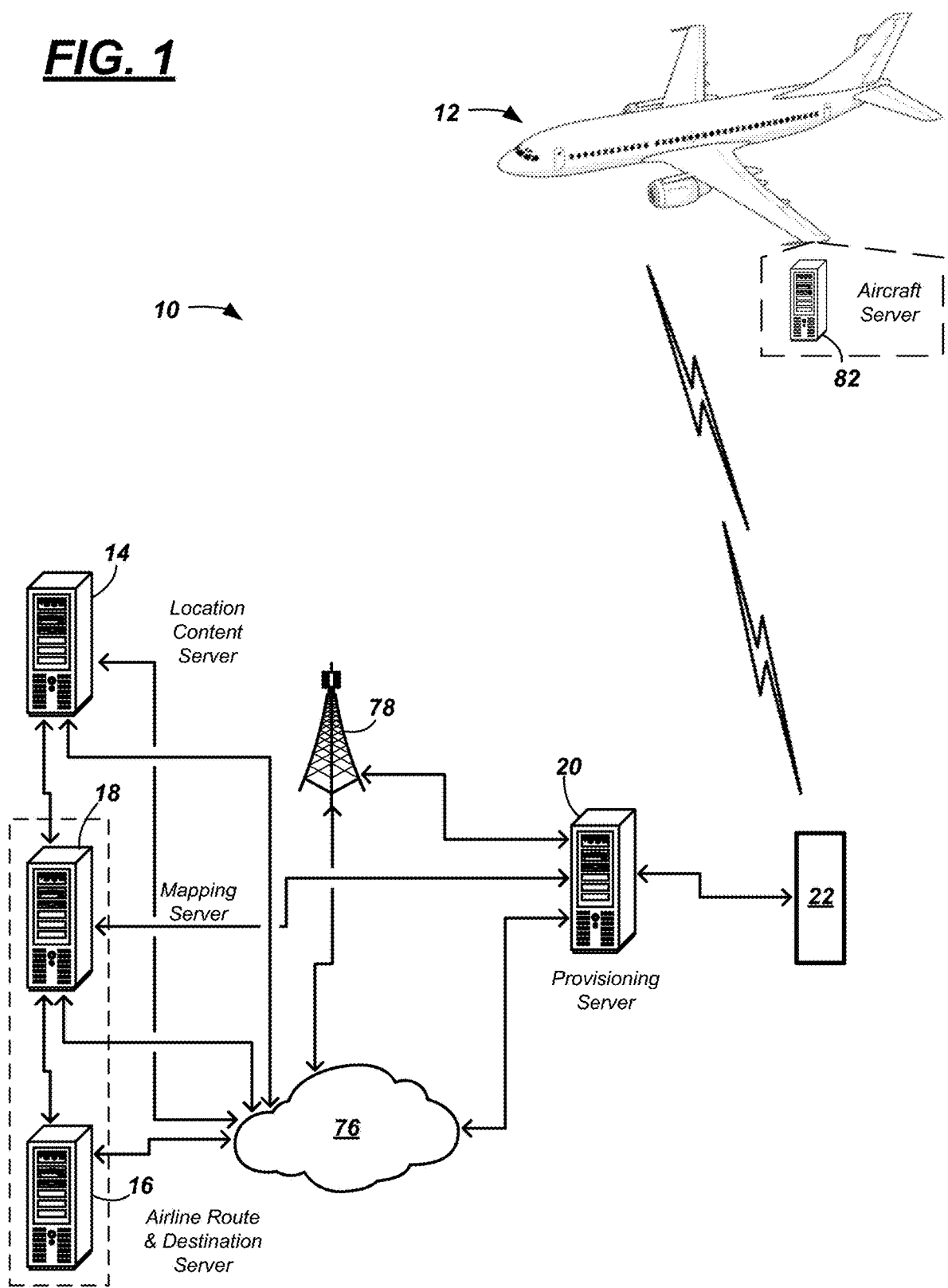
FIG. 1 is a schematic diagram illustrating a time-sensitive, data reduction system.

A time-sensitive, data reduction system is described which facilitates a personalized passenger experience onboard an aircraft. According to an aspect of the system, a method is disclosed of presenting, to a passenger on an aircraft, points of interest (POIs). The method comprises: receiving at least a portion of an airline-specific dataset, wherein the airline-specific dataset comprises a plurality of location records, wherein each location record comprises a point of interest (POI) and a unique rank, wherein the POI is defined by unique geographic identifier; determining a current position of the aircraft; and based on the current position and based on the unique rank of each of the plurality of location records, controlling, at a passenger display in the aircraft, a presentation of a map and a plurality of POI indicators associated with a highly-ranked subset of the plurality of location records. According to another aspect of the system, a plurality of servers are used provide relevant location-related content to an aircraft passenger.

According to the at least one example of the method set forth above, the highly-ranked subset of the plurality of location records have a higher rank than a remaining subset of the plurality of location records.

According to the at least one example of the method set forth above, the airline-specific dataset is received from a mapping server that assigns the unique rank to each of the plurality of location records.

According to the at least one example of the method set forth above, each of the plurality of location records further comprises at least one metadata.

According to the at least one example of the method set forth above, the at least one metadata comprises one of: a title of a POI, a description of a POI, one or more image files related to a POI, a category of a POI, one or more curated social media posts related to a POI, or one or more internet hyperlinks related to a POI.

According to the at least one example of the method set forth above, the determining the current position further comprises: receiving, from an in-flight aircraft positioning system, the current position.

According to the at least one example of the method set forth above, the unique rank is based on demographic data, psychographic data, or both of a plurality of passengers onboard the aircraft.

According to the at least one example of the method set forth above, further comprising presenting a predetermined quantity of POIs using the plurality of POI indicators.

According to the at least one example of the method set forth above, further comprising controlling, at the display, the presentation of a geofence region, wherein each of the plurality of POI indicators are located within the geofence region.

According to the at least one example of the method set forth above, further comprising: receiving a passenger command to resize the geofence region; and in response to the command: determining an updated plurality of location records each having a POI within the resized geofence region; and resizing the geofence region on the display and controlling the presentation of an updated plurality of POI indicators for each of the updated plurality of location records.

According to the at least one example of the method set forth above, the geofence region is a destination of a current flight of the aircraft.

According to the at least one example of the method set forth above, further comprising: prior to controlling the presentation, re-ranking the plurality of location records based on an input to a passenger survey presented via the display.

According to the at least one example of the method set forth above, the receiving, determining, and controlling steps are executed by an aircraft server.

According to the at least one example of the method set forth above, the receiving, determining, and controlling steps are executed at least partially by the display.

According to another illustrative example, a computer program product is disclosed. The product may comprise a non-transitory computer-readable medium, comprising a set of instructions executable by an aircraft server to control a presentation via an aircraft passenger display, the instructions comprising, to: receive an airline-specific dataset comprising a plurality of location records, wherein each location record comprises a point of interest (POI) and a unique rank, wherein the POI is defined by unique geographic identifier; determine a current position of the aircraft; and based on the current position and based on the unique rank of each of the plurality of location records, control, at the display, the presentation of a map and a plurality of POI indicators associated with a highly-ranked subset of the plurality of location records.

According to the at least one example of the computer program product set forth above, the highly-ranked subset of the plurality of location records have a higher rank than a remaining subset of the plurality of location records.

According to the at least one example of the computer program product set forth above, the instructions further comprising to: control, at the display, the presentation of a geofence region, wherein each of the plurality of POI indicators are located within the geofence region; based on the display receiving a passenger command to resize the geofence region, determine an updated plurality of location records each having a POI within the resized geofence region; and control, at the display, the presentation of an updated plurality of POI indicators for each of the updated plurality of location records within the resized geofence region.

According to another illustrative example, another method is disclosed. The method comprises: providing for installation, on a mapping server, a first set of computer-executable instructions, comprising to: receive a global location dataset, comprising a first plurality of location records, wherein each of the first plurality of location records comprises a point of interest (POI) and a unique rank, wherein the POI is defined by unique geographic identifier; receive airline service-region data from at least one airline route and destination server; and generate an airline-specific dataset by correlating a plurality of routes of the airline service-region data with POIs of a portion of the global location dataset; and providing for installation, on an aircraft server, a second set of computer-executable instructions, comprising to: receive the airline-specific dataset; determine a current position of the aircraft; and based on the current position and based on the unique rank of each of the plurality of location records, controlling, at an aircraft passenger display, a presentation of a map and a plurality of POI indicators, wherein each of the plurality of POI indicators is associated with a highly-ranked location record.

According to the at least one example set forth above, further comprising: providing for installation, on a location content server, a third set of computer-executable instructions, comprising to: generate the global location dataset by generating the first plurality of location records; store the global location dataset; update the global location dataset; and based on the update, electronically send the global location dataset to the mapping server.

According to another illustrative example, a system is disclosed that comprises: a plurality of displays; and an aircraft server, communicatively linked to the plurality of displays, and programmed to: store an airline-specific dataset comprising a plurality of location records, wherein each location record comprises a point of interest (POI) and a unique rank, wherein the POI is defined by unique geographic identifier; determine a current position of an aircraft; based on the current position and based on the unique rank of each of the plurality of location records, provide to the plurality of displays, a map and a plurality of POI indicators associated with a highly-ranked subset of the plurality of location records.

According to the at least one example, a computer is disclosed that is programmed to execute any combination of the examples of the method(s) set forth above.

According to the at least one example, a computer program product is disclosed that includes a non-transitory computer readable medium storing instructions executable by a computer processor, wherein the instructions include any combination of the instruction examples set forth above.

According to the at least one example, a computer program product is disclosed that includes a non-transitory computer readable medium that stores instructions executable by a computer processor, wherein the instructions include any combination of the examples of the method(s) set forth above.

Turning now to the figures wherein like reference numerals indicate like features and/or similar functions, a time-sensitive, data reduction system 10 is shown; the system 10 provides, to passengers during flight on an aircraft 12, useful and up-to-date information that is relevant to the respective passenger's journey and/or interests. More particularly, a voluminous amount of location-related data can be collected and parsed through a series of computer servers in order to present—on an aircraft display—more relevant content to a passenger onboard an airline flight. Ultimately, each passenger is presented with a plurality of popular, ranked geographic locations which are relevant to his/her current geographic position during flight and/or his/her route (which may comprise ranked geographic locations of the passenger's destination as well). Moreover, to minimize presenting stale data to passengers, measures are described herein to heighten the accuracy of the rankings and thereby increase the relevancy of the data. In some examples, to further increase relevancy, these measures further are based on specific passenger and/or an aircraft context.

System 10 may be embodied via multiple services which are each illustrated using a server. Such depiction is for illustrative purposes only. For example, each service may be executed using one or multiple servers (at least some of which may be interconnected via any suitable communication network) and any suitable additional hardware (which may or may not be shown in the figures). In FIGS. 1-5, a global location data service is illustrated using a location content server 14, an airline service-region data service is illustrated using an airline route and destination server 16, a map correlation service is illustrated using a map service is illustrated using a mapping server 18, and a provisioning service is illustrated using a provisioning server 20 and a provisioning communication interface 22. Each will be discussed in turn.

Figure 2:
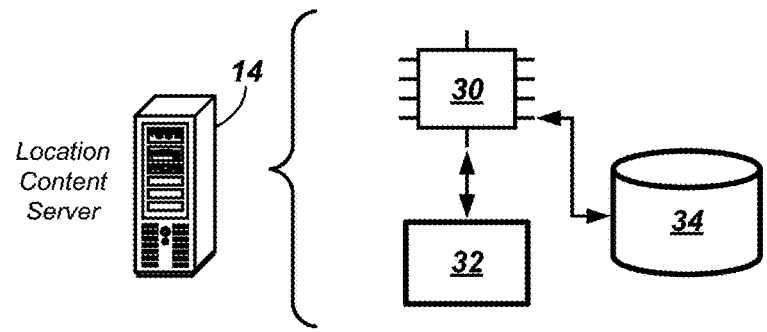
FIG. 2 is a schematic diagram a location content server of the system shown in FIG. 1.

Location content server 14 may collect data regarding points of interest (POIs) to aircraft passengers, generate location records based on those POIs, include a ranking in the location records (e.g., relative to other location records), store a master collection of these ranked location records (referred to herein as a global location dataset), and distribute at least some of the ranked location records to the mapping server 18 (see also FIG. 2). As used herein, a point of interest (POI) refers to a geographic location to which the public has some awareness and gives some attention or interest. A POI may be defined by a set of geographic coordinates—e.g., such as a latitude (LAT) and longitude (LON). As used herein, a location record comprises a unique geographic identifier of a point of interest and a unique rank relative to other location records. An identifier should be broadly construed to include any suitable alphanumeric value, a text tag, or the like. As used herein, a rank or ranking refers to moving to a position of hierarchy. And as used herein, a high rank (or 'higher rank' or 'highest ranked' or 'highly-ranked') location record is a relative term pertaining to that record and which means that—with respect to the POI of the respective location record—the public interest is greater or more interested regardless of whether any numerical value (representing its rank) is higher or lower than that of other location records (for instance, depending on the algorithm, a highest ranked location record of a given set of records could have the highest numerical score or the lowest numerical score of the given set); thus, a 'higher' rank refers to a level of public interest. To illustrate, Wrigley Field, Ill., USA (having a unique geographic identifier such as LAT, LON of 41.948038, −87.65568) may be ranked higher than Old Prairie Town at Ward-Meade Historic Site, Kansas, USA (having a unique geographic identifier such as LAT, LON of 39.0636, −95.6835) due to a greater public interest in Wrigley Field relative to Old Prairie Town. Thus, in the present context of ranking, hierarchy pertains to a level of public interest between a plurality of POIs.

In at least some examples, the location record further comprises a unique location dataset identifier (LID) and at least one metadata. The LID may be any suitable alphanumeric value or the like.

Metadata, as used herein, means information about a respective POI. Non-limiting examples of metadata include a title (e.g., a text file or label), a description (e.g., a text file or label), one or more image files regarding something at the POI, a category of the POI (e.g., an identifier indicating a hotel, a transportation hub, a restaurant or bar, a shopping mall or shopping center, a recreational park, a theme park, a sports facility, a historical site, a theater, a zoo, or the like), one or more curated social media posts, and one or more internet hyperlinks, just to name a few non-limiting examples. Thus, according to at least one example, each location record comprises data such as shown in Example 1 below.

Example 1

Location record=[LID, LAT, LON, R, M(1), . . . , M(n)], wherein R is a rank and M(1), . . . , M(n) are metadata, wherein n≥1.

Location content server 14 may comprise one or more computing and/or storage devices. According to a non-limiting example, server 14 may comprise at least one processor 30 and memory 32; e.g., processor 30 may be programmed to process and/or execute digital instructions stored in memory 32. Processor 30 may be any electronic device or circuit programmed and/or otherwise configured to: receive information regarding POIs across the globe; receive information regarding POIs for a predefined geographic region (meaning a predefined geographic region of service defined by an airline, as discussed below); receive information regarding POIs and formulate location records using this information—e.g., including ranking the POIs based on predetermined rules. For instance, according to one example, POI data may be received by monitoring traffic of preselected websites and/or social media sites or their respective software applications (e.g., Wikipedia™, Facebook™, Flickr™, Shutterstock™, just to name some non-limiting examples)—e.g., a ranking may be developed based on a volume of web traffic, page visits, dwell time per page, etc. Non-limiting examples of processor 30 include a microprocessor, a microcontroller or controller, an application specific integrated circuit (ASIC), a field-programmable gate array (FPGA), one or more electrical circuits comprising discrete digital and/or analog electronic components arranged to perform predetermined tasks or instructions, etc.—just to name a few.

Memory 32 may include any non-transitory computer usable or readable medium, which may include one or more storage devices or articles. Exemplary non-transitory computer usable storage devices include conventional hard disk, solid-state memory, random-access memory (RAM), read-only memory (ROM), erasable programmable read-only memory (EPROM), electrically erasable programmable read-only memory (EEPROM), as well as any other volatile or non-volatile media. Non-volatile media include, for example, optical or magnetic disks and other persistent memory, and volatile media, for example, also may include dynamic random-access memory (DRAM). These storage devices are non-limiting examples; e.g., other forms of computer-readable non-volatile storage media exist and include magnetic media (e.g., disk or tape), compact disc ROM (CD-ROMs), digital video disc (DVDs), other optical media, any suitable memory chip, cartridge or flash RAM (e.g., such as a portable USB flash drive), or any other medium from which processor 30 can read. In general, memory 32 can store instructions executable by processor 30 and also can store data to be used when executing the instructions.

Location content server 14 also may comprise at least one database 34 which may store large quantities of location records. For example, database 34 may include so-called data repositories and so-called data stores and may include various kinds of mechanisms for storing, accessing, and retrieving various kinds of data, including a hierarchical database, a set of files in a file system, an application database in a proprietary format, a relational database management system (RDBMS), etc. According to the illustrated example set forth herein, database(s) 34 stores location records once determined by processor(s) 30, as described more below.

Figure 3:
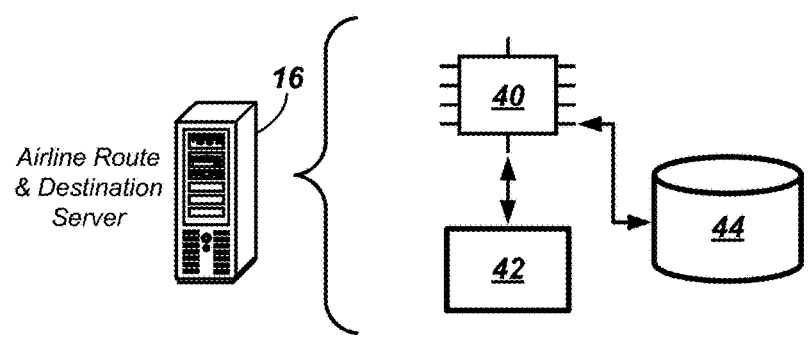
FIG. 3 is a schematic diagram an airline route and destination server of the system shown in FIG. 1.
Figure 4:
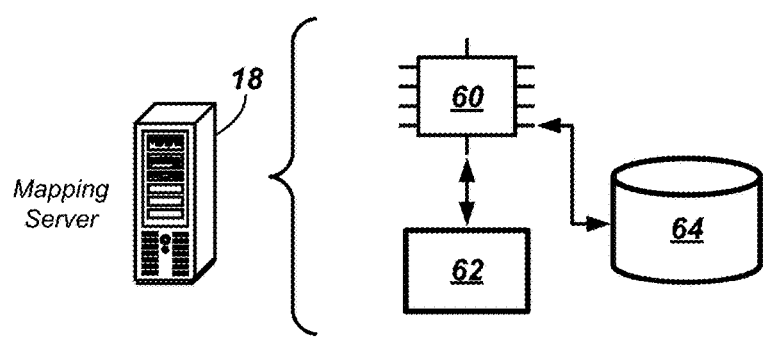
FIG. 4 is a schematic diagram a mapping server of the system shown in FIG. 1.
Figure 5:
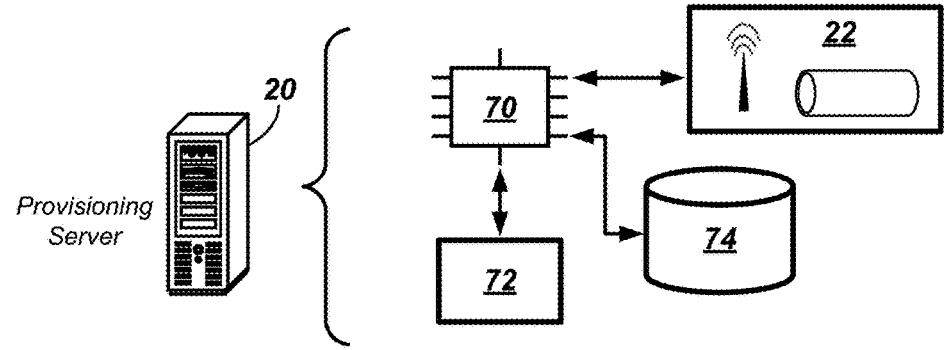
FIG. 5 is a schematic diagram a provisioning server of the system shown in FIG. 1.

Airline route and destination server 16 stores up-to-date airline service-region data regarding at least one airline (see FIGS. 1, 3). As used herein, an airline is a business organization providing a regular public service of air transportation on one or more routes. As used herein, airline service-region data refers to information regarding one or more predefined geographic regions within which an airline services passengers (e.g., the predefined geographic regions including the routes therein). As used herein, a route means a predetermined path definable using a series of latitude and longitude way-points extending from an origin (i.e., a flight departure location; e.g., a take-off location) to a destination (i.e., a flight arrival location; e.g., a landing location), including the respective endpoints (e.g., the respective origin and destination). Thus, as described more below, while a pre-flight plan may designate a route, it will be appreciated that the predetermined path comprises a predefined degree of tolerance with respect thereto (e.g., a deviation(s) from the predetermined path). For example, the United States may comprise multiple predefined geographic regions (e.g., a West Coast Region, a Southwest Region, a Midwest Region, a Southeast Region, and a Northeast Region); e.g., wherein the Midwest Region could include the states of North Dakota, South Dakota, Nebraska, Kansas, Minnesota, Iowa, Missouri, Wisconsin, Illinois, Indiana, Michigan, Ohio, and Kentucky. Thus, airline service-region data for a particular region may comprise all routes for that airline within the Midwest Region. As will be described more below, both predefined geographic regions and predefined airline routes may be correlated with the global location dataset to ultimately present information to an airline passenger. In one example, system 10 comprises multiple airline route and destination servers 16 (e.g., each airline route and destination server 16 may be associated with a different airline). And in at least some examples, one server 16 may store airline service-region data for multiple airlines.

In at least one example, the hardware components of server 16 (e.g., at least one processor 40, memory 42, and at least one database 44) may be identical to those of server 14; therefore, they will not be described in great detail here. That said, it should be appreciated that data and any instructions stored in memory 42 (and executable or otherwise usable by processor 40) may differ (at least in part) from the data and instructions associated with processor 30 and memory 32. For example, processor 40 may receive a request (for airline service-region data) from mapping server 18, and in response to the request, server 16 (via processor 40) may respond by providing the requested information. Similarly, while hardware of database 44 may be similar or identical to hardware of database 34, database 44 may store different information. According to one example, database 44 may store up-to-date airline service-region data pertaining to all predefined geographic regions in which the airlines operate and scheduled flights (e.g., origin, departure time, destination, arrival time, route data, planned flight duration, etc.) for each route an airline travels.

Mapping server 18 (FIGS. 1, 4) may receive a plurality of location records from the location content server 14 and may receive airline service-region data from airline route and destination server 16, and in response to receiving the location records and airline service-region data, mapping server 18 may correlate some of the location records with the airline service-region data—the resulting correlation being an airline-specific dataset. Thus, as used herein, an airline-specific dataset means a subset of location records wherein the POIs of the location records are found within the predefined geographic regions; according to one example, the location records are found along and relative to a route of a respective airline—including but not limited to the route's destination. Thus, the mapping server 18 may perform a filtering function—as used herein, to filter (or perform a filtering function) means to reduce a quantity of location records. In this context, the airline-specific dataset contains fewer (and likely substantially fewer) location records than the location records of the global location dataset (e.g., the airline-specific dataset is a subset of the global location dataset).

Figure 6:
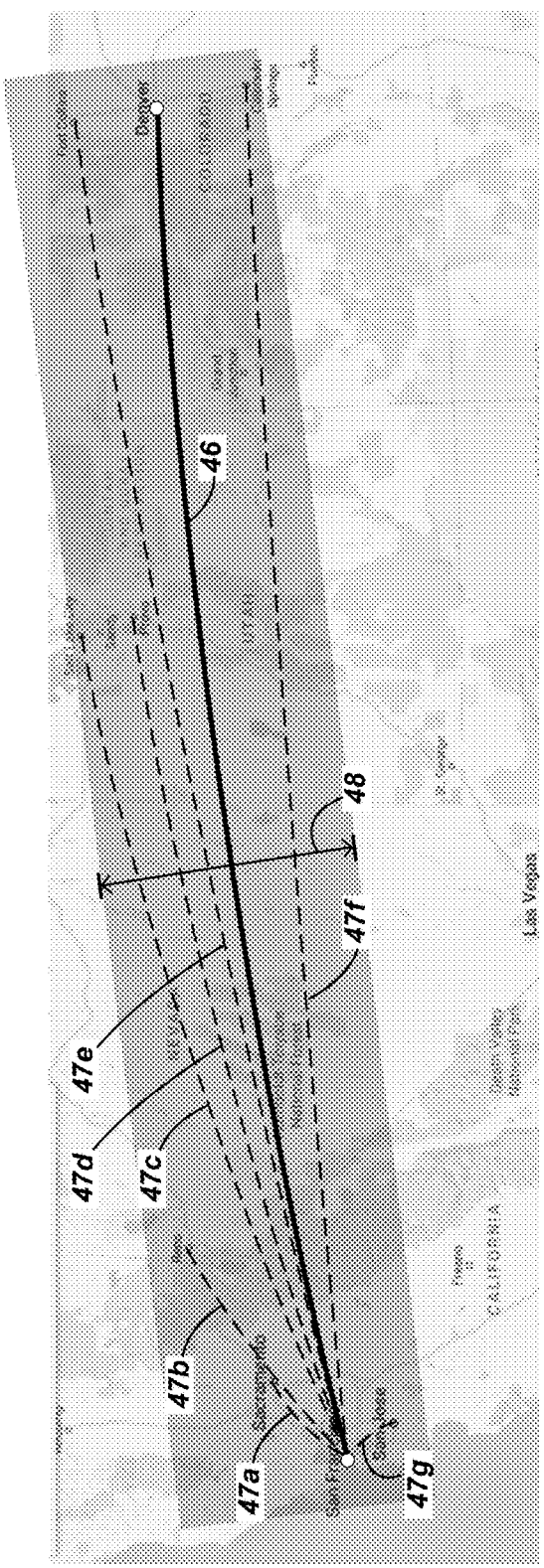
FIG. 6 is a diagram illustrating a few routes of an airline.

FIG. 6 shows an example of a flight route 46 of aircraft 12 from San Francisco (SFO) to Denver (DEN) for illustrative purposes only. In addition to route 46, the figure shows a number of additional routes 47a, 47b, 47c, 47d, 47e, 47f, 47g traveled by the same airline that owns and operates aircraft 12, wherein these routes 47a-47g (and/or their destinations) may be located relative to the SFO to DEN route 46 (e.g., within a predetermined range 48 of route 46). The predetermined range 48 may be any suitable tolerance with respect to route 46; according to one example, the range 48 is 50 miles (e.g., +25/−25 miles—i.e., 25 miles outwardly of route 46 on one side and 25 miles outwardly of route 46 on the other side). According to other non-limiting examples, range 48 may be 100 miles, 150 miles, 200 miles, or the like. Thus, by way of example, the global location dataset may comprise millions of location records, and an airline-specific dataset (for an airline which services many destinations) could comprise hundreds of thousands of location records.

Figure 7:
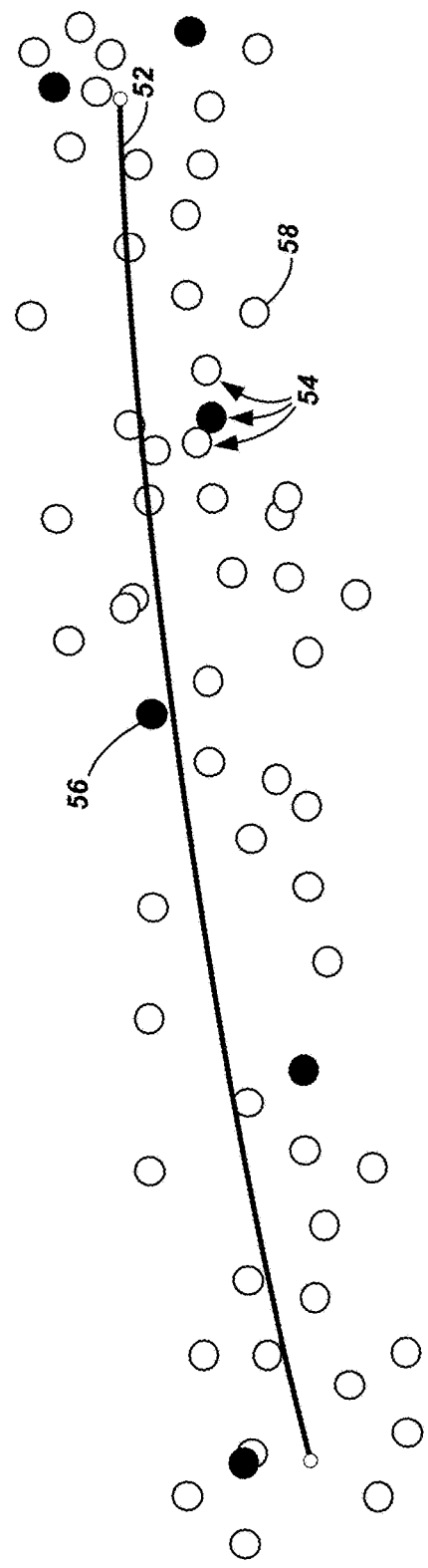
FIG. 7 is a schematic diagram illustrating points of interest along a route.

FIG. 7 illustrates a simplified example of an airline-specific dataset (e.g., simply showing a route 52 and a plurality of POIs 54 along the route 52 (e.g., each POI having a LAT, LON, as defined by the location record to which the POI belongs). FIG. 7 also illustrates some of the POIs 54 may be highly-ranked POIs 56 (e.g., a top ten percent (10%) of those along the route 52), while other POIs 58 are ranked lower (e.g., lower ninety percent (90%) of those along the route 52).

Returning to FIG. 4, in at least one example, the hardware components of mapping server 18 (e.g., at least one processor 60, memory 62, and at least one database 64) may be identical to those of server 14; therefore, they will not be described in great detail here. That said, it should be appreciated that data and any instructions stored in memory 62 (and executable or otherwise usable by processor 60) may differ (at least in part) from the data and instructions associated with processor 30 and memory 32. For example, processor 60 may execute one or more of the following illustrative instructions: receive a global location dataset or a portion thereof from the location content server 14 and receive airline service-region data from the airline route and destination server 16; generate an airline-specific dataset based on determining which POIs of the location records are within a predetermined range 48 of each of the routes of the respective airline; re-rank the location records based on public interest (e.g., rank R'); for the airline-specific dataset, update the location records (e.g., assign rank value R of the respective location record to be R' (e.g., the new ranking)); provide the airline-specific dataset to a provisioning server 20; and repeat the afore-cited instructions for another airline. As used herein, re-ranking refers to ranking again—in some instances this may comprise ranking a smaller quantity of location records, in some instances this may comprise reordering location records; and in some instances, this may comprise both.

According to at least one example, one or more of the instructions—previously described as executable by the mapping server 18—alternatively may be executed by the airline route and destination server 16 instead. In other examples, one or more intermediates servers (not shown)—positioned communicatively between the airline route and destination server 16 and mapping server 18—may be programmed to execute one or more of the instructions described as executable by the airline route and destination server 16 and/or the mapping server 18.

As discussed briefly above, provisioning server 20 (FIGS. 1, 5) may facilitate communication of airline-specific datasets to aircraft 12 and other similar aircraft. While not required, the provisioning server 20 typically is controlled and operated by the respective airlines. Thus, it is not uncommon for the mapping server 18 to deliver a different airline-specific dataset to each of a plurality of airline provisioning servers 20.

In at least one example, the hardware components of provisioning server 20 (e.g., at least one processor 70, memory 72, and at least one database 74) may be identical to those of server 14; therefore, they will not be described in great detail here. That said, it should be appreciated that data and any instructions stored in memory 72 (and executable or otherwise usable by processor 70) may differ (at least in part) from the data and instructions associated with processor 30 and memory 32. For example, processor 70 may execute one or more of the following illustrative instructions: receive an airline-specific dataset (or an update thereof) from mapping server 18; when aircraft 12 is linked wirelessly or by wire to an provisioning server 20 using interface 22, download the airline-specific dataset or update thereof to the aircraft 12; when aircraft 12 is wirelessly linked to provisioning server 20 (e.g., during flight, on an airport tarmac, etc.) wirelessly download the airline-specific dataset or update thereof to the aircraft 12.

Provisioning communication interface 22 may be any suitable communication interface which operates according to any suitable communication protocol and which is used by the provisioning server 20 to communicate the airline-specific dataset between server 20 and the aircraft 12. Thus, interface 22 may utilize any suitable wired implementation (e.g., Ethernet, Fire-wire, etc.) and/or any suitable short, medium, or long-range wireless technique (e.g., Bluetooth, Wi-Fi, Wi-Fi Direct, Dedicated Short Range Communication (DSRC), cellular, satellite, etc.).

Any of the aforementioned servers 14-20 may be a logical construct within a virtualized and/or cloud-hosted service. In addition, each of aforementioned servers 14-20 may be communicatively linked (e.g., directly or indirectly), as shown in FIG. 1 via a public network, a private network, or both—e.g., which may include a link via a land communication network 76, a wireless communication network 78, or both. For example, at the least, location content server 14 and airline route and destination server 16 are linked to mapping server 18, and mapping server 18 is linked to provisioning server 20, wherein provisioning server 20 is linked to provisioning communication interface 22. Other connections (by wire or wirelessly) are contemplated also, including those shown in FIG. 1.

Land communication network 76 can enable connectivity between servers 14-20—e.g., via a public switched telephone network (PSTN) such as that used to provide hard-wired telephony, packet-switched data communications, internet infrastructure, and the like. Wireless communication network 78 can enable connectivity between servers 14-20—e.g., including satellite communication architecture and/or may include cellular telephone communication over wide geographic region(s). Thus, in at least one example, network 78 includes any suitable cellular infrastructure that could include eNodeBs, serving gateways, base station transceivers, and the like. Further, network 78 may utilize any suitable existing or future cellular technology (e.g., including LTE, CDMA, GSM, etc.). As illustrated, land and wireless communication networks 76, 78 may be communicatively coupled to another as well.

Figure 8:
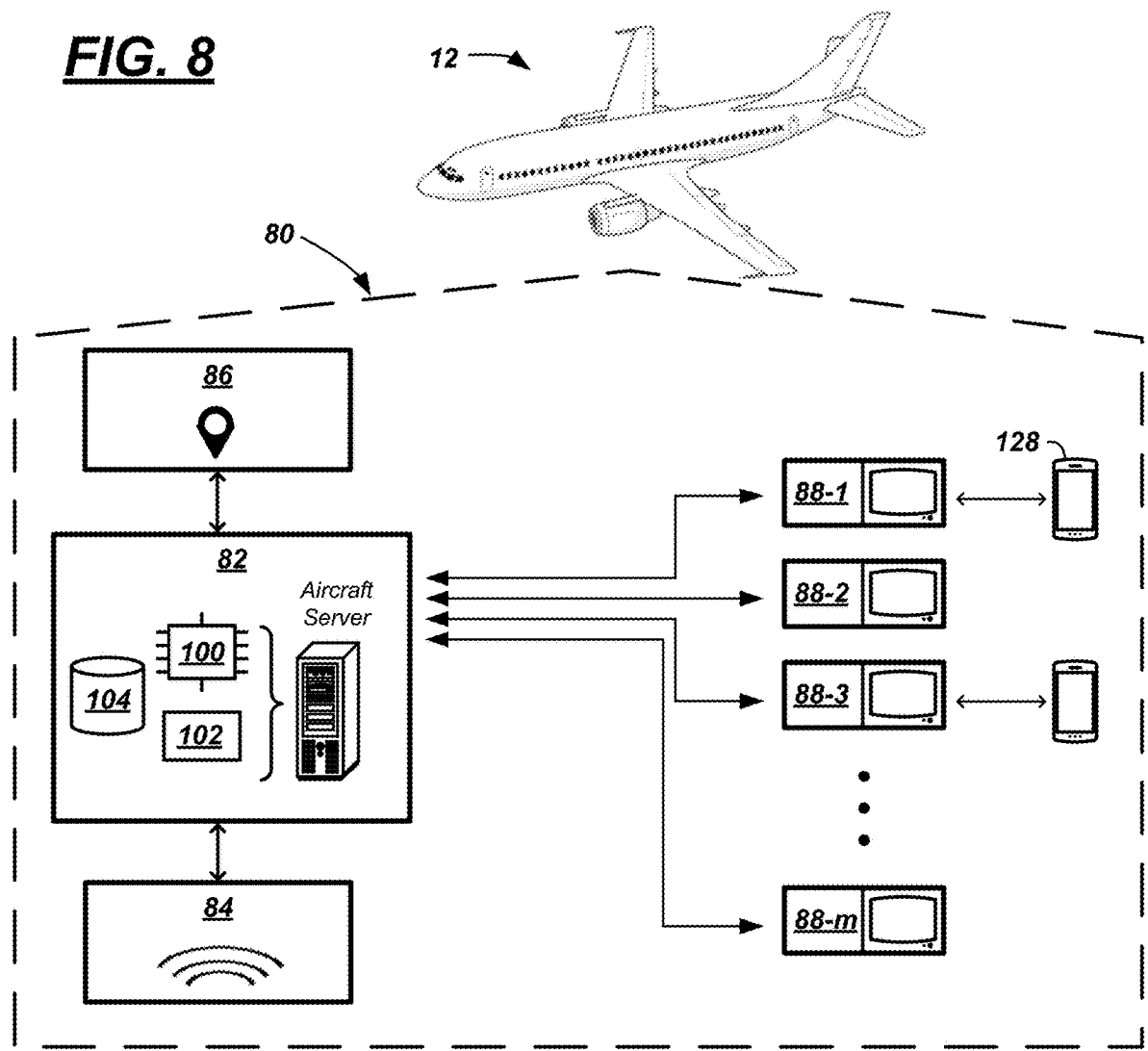
FIG. 8 is a schematic diagram of an aircraft electronics system.

Turning to FIG. 8, aircraft 12 is shown. Aircraft 12 may be any suitable machine capable of flight that carries human passengers. In some examples, aircraft 12 is a commercial aircraft carrying a plurality of passengers (e.g., one in which passengers may purchase air travel for personal transport from an origin to a destination; such commercial aircraft also typically carry or otherwise transport goods, including but not limited to passenger luggage and other personal items). As used herein, a passenger is a living human being. Non-limiting examples of aircraft 12 include Airbus 380-800, Boeing 777-300, Boeing 747-400, and Airbus 340-600, or any other short- or long-range, narrow- or wide-body commercial jet aircraft adapted to carry passengers. For example, aircraft 12 may comprise other types of aircrafts such as private passenger jets and the like.

FIG. 8 also illustrates a portion of an aircraft electronics system 80 comprising an aircraft server 82, a wireless communication system 84, an in-flight aircraft positioning system 86, and a plurality of passenger displays 88-1, 88-2, 88-3, . . . , 88-*m* (a quantity 'm' displays onboard the aircraft 12 being shown by way of example). Aircraft server 82 may be communicatively connected to the wireless communication system 84, the in-flight aircraft positioning system 86, and each of the displays 88-1 to 88-*m* via a bus, discrete connections, or the like. According to at least one example, the hardware components of server 82 (e.g., at least one processor 100, memory 102, and/or at least one database 104) may be identical to those of server 14; therefore, they will not be described in great detail here. That said, it should be appreciated that data and any instructions stored in memory 102 (and executable or otherwise usable by processor 100) may differ (at least in part) from the data and instructions associated with processor 30 and memory 32. For example, processor 100 may be programmed to: receive (from provisioning server 20—e.g., via provisioning communication interface 22) an airline-specific dataset or update thereof, store that airline-specific dataset (or update thereof) in memory 102 and/or database 104; communicate with provisioning server 20 via wireless communication system 84 (e.g., during flight); receive a current position of the aircraft 12 from in-flight aircraft positioning system 86 (e.g., receive LAT data, LON data, heading data, aircraft speed data, and/or the like); provide application software updates or data updates to displays 88-1 to 88-*m*; receive and/or store passenger profile data, received via displays 88-1 to 88-*m*; and receive a passenger input (e.g., to take a specific action) via displays 88-1 to 88-*m*, just to name a few non-limiting examples of executable instructions.

Wireless communication system 84 may comprise any suitable long-range wireless communication devices enabling the aircraft 12 to communicate (albeit sometimes intermittently) with terrestrial devices (and/or other aircraft that are in-flight). Non-limiting examples of wireless communication types usable by system 84 include various satellite communications and various radio communications.

Figure 9:
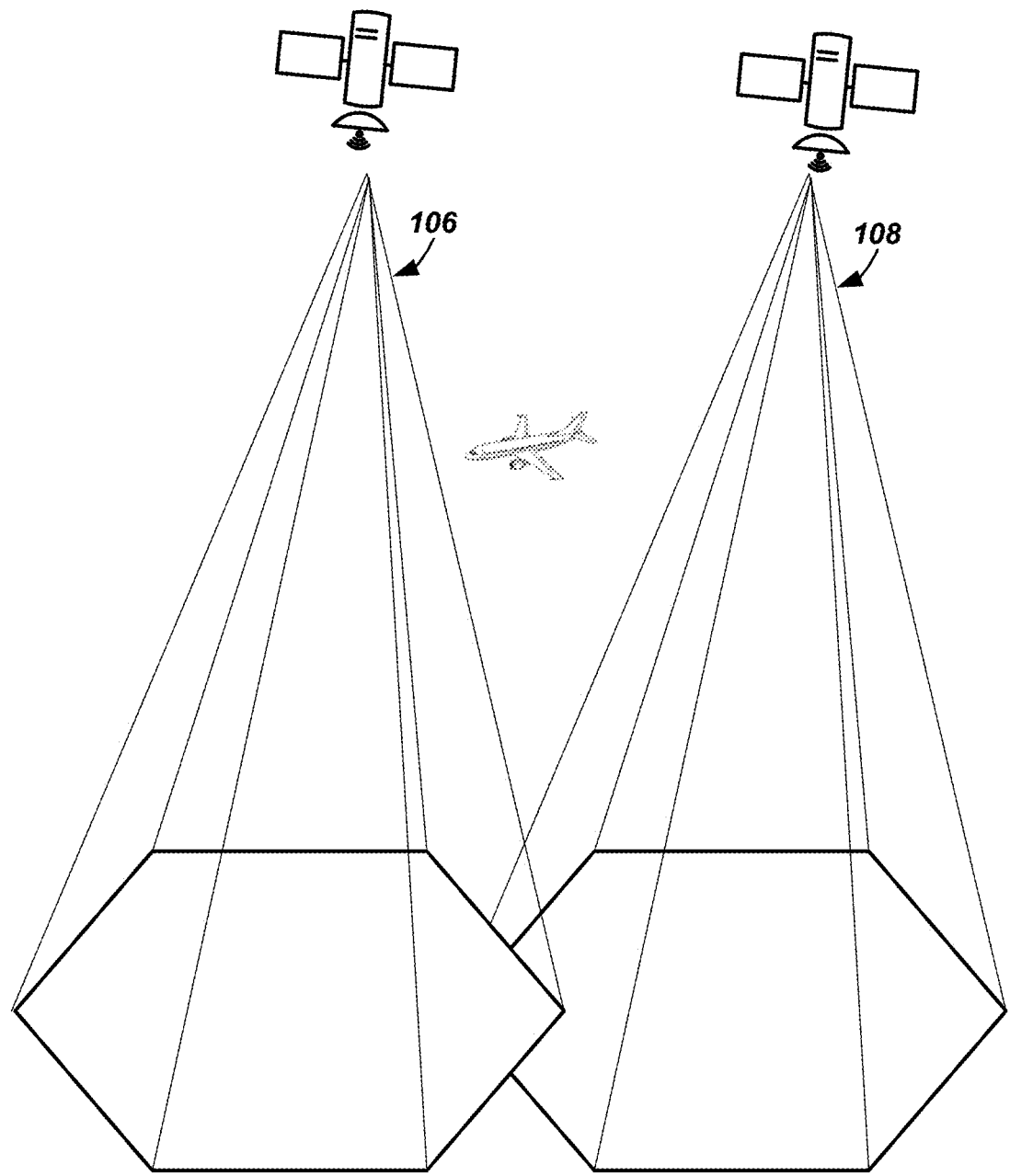
FIG. 9 is a diagram illustrating intermittent satellite communication.

It will be appreciated that generally, during commercial aircraft flight, cellular signals are out-of-range due to aircraft altitude and speed, etc. Further, satellite beams are configured to project onto the earth's surface; thus, while aircraft 12 may pass through these beams 106, 108 at high altitude (FIG. 9), the beam diameter at high altitude is relatively smaller than its earthly projection. Thus, the aircraft may experience intermittent communication via satellite. However, even when the aircraft 12 travels through overlapping beams, a satellite hand-off period may cause an interruption in communication as well (e.g., typically on a magnitude of 30-45 seconds). With respect to either satellite or radio, weather can cause communication intermittency—e.g., disrupting the strength and/or quality of communication signals. At least one process described below improves aircraft location identification accuracy.

Returning to FIG. 8, in-flight aircraft position system 86 may comprise any suitable positioning electronic device(s) which provide as output, to an aircraft pilot, position information (e.g., such as LAT data, LON data, heading data, aircraft speed data, and/or the like). In the current context, at least a portion of this position information may be communicated to aircraft server 82 and/or passed through server 82 to displays 88-1 to 88-*m*. One non-limiting example of system 86 may be a so-called Flight Management System (FMS). Another example of system 86 is an Aeronautical Radio, Incorporated (ARINC) or equivalent. Still other examples exist.

Each of displays 88-1, 88-2, 88-3, . . . , 88-*m* may be located within a passenger region (e.g., cabin) of aircraft 12. According to one example, each of the displays 88-1, 88-2, 88-3, . . . , 88-*m* may be identical; therefore, only one (88-1) will be described in detail.

Figure 10:
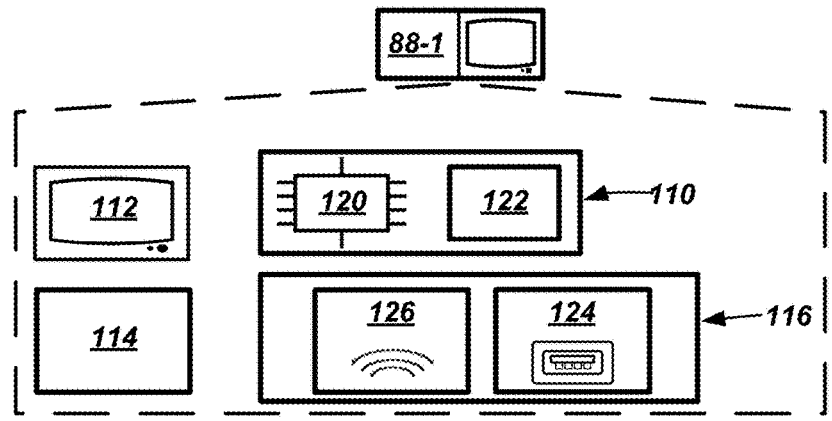
FIG. 10 is a schematic diagram of a passenger display.

As shown in FIG. 10, display 88-1 may comprise a computer 110, a screen 112, a user interface 114 (e.g., for providing at least input to display 88-1), and a communication interface 116. Computer 110 may comprise at least one processor 120 and memory 122, wherein processor 120 may be programmed to process and/or execute digital instructions stored in memory 122. Non-limiting examples of processor 120 include a microprocessor, a microcontroller or controller, an application specific integrated circuit (ASIC), a field-programmable gate array (FPGA), one or more electrical circuits comprising discrete digital and/or analog electronic components arranged to perform predetermined tasks or instructions, etc.—just to name a few.

Memory 122 may include any non-transitory computer usable or readable medium, which may include one or more storage devices or articles. Exemplary non-transitory computer usable storage devices include conventional hard disk, solid-state memory, random-access memory (RAM), read-only memory (ROM), erasable programmable read-only memory (EPROM), electrically erasable programmable read-only memory (EEPROM), as well as any other volatile or non-volatile media. Non-volatile media include, for example, optical or magnetic disks and other persistent memory, and volatile media, for example, also may include dynamic random-access memory (DRAM). These storage devices are non-limiting examples; e.g., other forms of computer-readable non-volatile storage media exist and include magnetic media (e.g., disk or tape), compact disc ROM (CD-ROMs), digital video disc (DVDs), other optical media, any suitable memory chip, cartridge or flash RAM (e.g., such as a portable USB flash drive), or any other medium from which processor 120 can read.

By way of example, processor 120 may be programmed and/or otherwise configured to: receive an airline-specific dataset; present, via screen 112, an interactive passenger survey or the like; re-rank location records based on passenger interaction with the survey; receive an aircraft current position; present, via the screen 112, a map and a predetermined quantity of POIs; permit the passenger, via the screen 112, to resize a geofence region of map; and/or receive passenger input to perform a specific action (e.g., such as updating the passenger's profile, ordering airline tickets, making reservations, etc.), just to name a few examples.

Screen 112 may be any suitable electronic device, coupled to computer 110, for displaying information—e.g., such as a liquid crystal display (LCD) or light-emitting diode (LED) display. In some examples, screen 112 may not only be an output device but also be an input device (e.g., embodied as a touchscreen). Non-limiting examples include a capacitive or resistive touchscreen. Further, while not shown, screen 112 may comprise a cover, a backlight, etc. assembled according to techniques known in the art.

User interface 114 may comprise any suitable user input devices. For example, user interface 114 may comprise knobs, dials, buttons, etc. for controlling passenger input to the display 88-1. In at least one example, the user interface 114 is optional—e.g., wherein the all controls are executable via a touchscreen.

Communication interface 116 may comprise any suitable wired ports 124 and/or any suitable wireless ports 126. For example, non-limiting examples of wired ports 124 include one or more USB sockets or the like. And non-limiting examples of wireless ports 126 include a Bluetooth, Wi-Fi, or Wi-Fi Direct transceiver capable of pairing with a passenger's portable wireless device 128 (e.g., see FIG. 8) (e.g., a Smartphone or the like).

Figure 11:
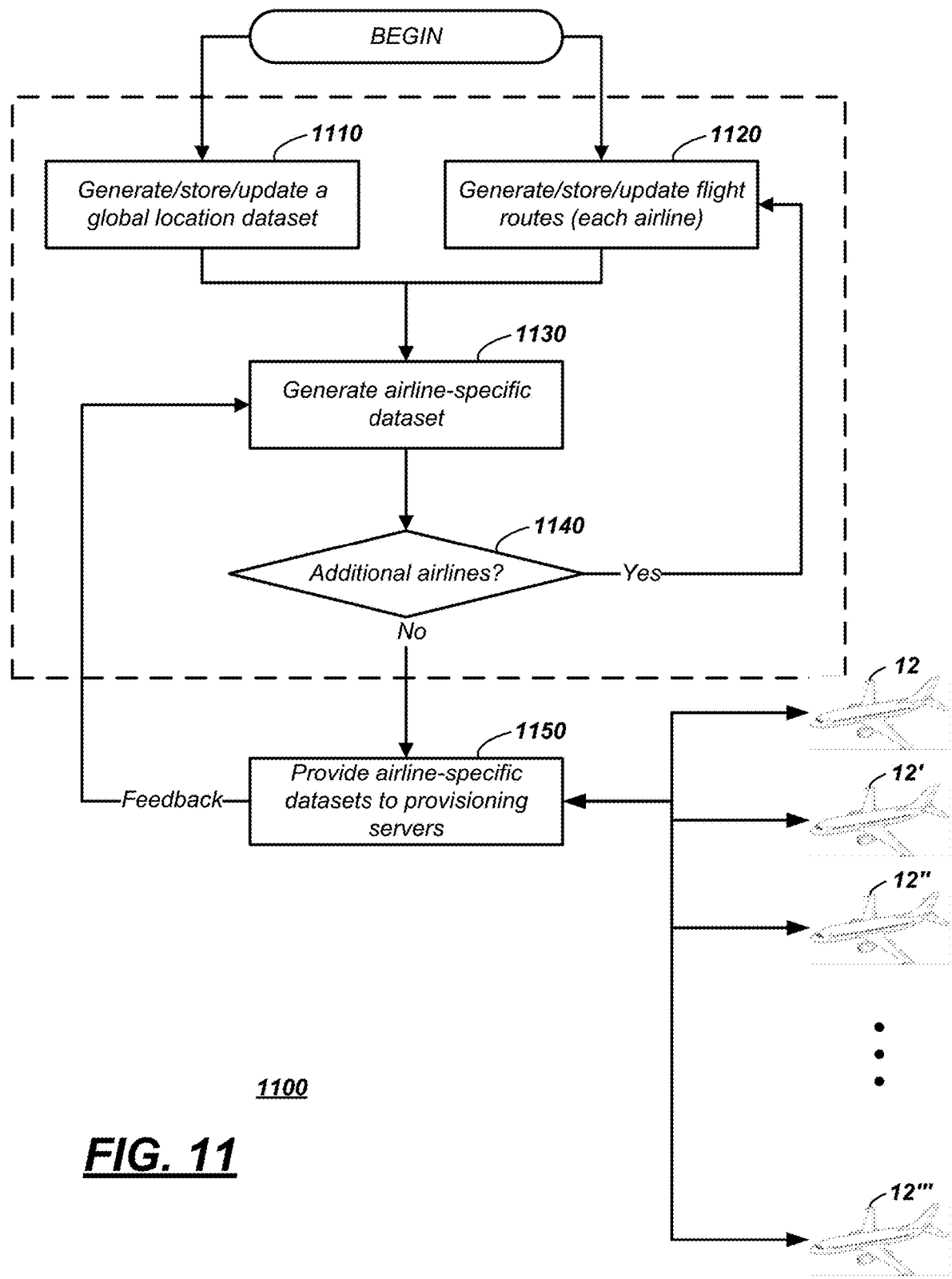
FIG. 11 is a flow diagram illustrating a process of provisioning a plurality of aircrafts with airline-specific datasets.

Turning now to FIG. 11, a process 1100 of provisioning a plurality of aircrafts 12, 12', 12'', 12''' with airline-specific datasets is illustrated. As will be apparent from the context of the description, the process 1100 may be carried out using servers 14, 16, 18, 20. Accordingly, each respective server may store and execute instructions to accomplish at least some of the functions described herein.

Process 1100 may begin with block 1110, wherein location content server 14 may generate and store a global location dataset. As described above, this global location dataset may comprise a plurality of location records. In at least one example, the location records span POIs across at least one predefined geographic region serviced by an airline. In another example, the location records span POIs across at least one predetermined country. In another example, the location records span POIs across at least one predetermined continent. In another example, the location records span POIs across the entire globe. For purposes of illustration, each of the location records of process 1100 may be characterized by Example 1 (above), e.g., [LID, LAT, LON, R, M(1), ..., M(n)]. While by no means an exhaustive list, additional non-limiting examples of POIs include: the most popular Rides in Disneyland, the most searched historical sites within a city, the attractions currently trending on a coastline in Southern Europe, the socially trending landmarks within a geographical region, the most tagged places to visit within walking distance of their reserved hotel, the most admired attractions below the aircraft 12, the most popular attractions ahead along the flight path of aircraft 12, the most 'liked' shopping center within a proximity to a business conference for which they are registered to attend, an ordered list of castles in a mountain region, and the most popular sports facilities within a country.

A manner in which location content server 14 may determine values for LID, LAT, LON, and M(1), ..., M(n) has been described above. Discussed below, a few non-limiting examples are provided by which the location content server 14 may generate a rank R for each location record. According to at least one example, the server 14 calculates a score and then ranks the location records according their respective scores to determine with which location records the public has the greatest interest. Accordingly to one example, the scores have a decimal value; for ranking purposes, any suitable number of decimal places may be used (e.g., including the millionth place or more).

According to one implementation, a cross-cultural score S1 may be generated using language translations relative to POIs. As shown in Equation 1, POI(languages) refers to the number of languages for which the POI has a translation, Languages(total) refers to the total number of languages on Earth (e.g., there are 302 Wild languages), and a parameter C refers to a category coefficient that can be used to scale one POI category with respect to other categories. According to one example, 0<C≤1; however, this is merely an example.

$$POI\ Score\ S1 = C * \frac{POI(\text{languages})}{\text{Languages(total)}}. \quad \text{Equation 1}$$

According to another implementation, a social media score S2 may be generated using images of POIs posted on social media. As shown in Equation 2, POI(images) refers to the number of image files posted on a predetermined social media platform (e.g., such as Flickr™), Images(total) refers to the total number of images posted on the predetermined social media platform (e.g., those posted images of the POI, as well as those unrelated to the POI posted on Flickr™), again parameter C may refer to the category coefficient described above, and a parameter K may be a weighting factor used, e.g., when the social media platform comprises minimal commercial bias (e.g., if commercial or other bias is relatively low, K may be >1 (e.g., K=2)), wherein less commercial bias may be an indicator of truer public interest.

$$POI\ Score\ S2 = C * \left[\frac{POI(\text{images})}{\text{Images(total)}}\right]^K. \quad \text{Equation 2}$$

It should be appreciated that some social media postings may be more relevant than others. For example, images may be posted on social media or otherwise posted online, and such postings may not be an indicator of a relatively higher public interest. For example, art students may post images for a class, some individuals may post for commercial gain, etc. Thus, parameter K may be used to adjust relevancy.

According to another implementation, a social media score S3 may be generated using images of POIs posted on a commercial database or website. As shown in Equation 3, POI(images) refers to the number of image files posted on a predetermined commercial database or website (e.g., such as Shutterstock™), Images(total) refers to the total number of images posted on the predetermined commercial database or website that pertain to any POI (e.g., again on Shutterstock™), and again parameter C may refer to the category coefficient described above.

$$POI \text{ Score } S3 = C * \frac{POI(\text{images})}{\text{Images(total)}}. \quad \text{Equation 3}$$

According to another implementation, a page view score S4 of a website may be generated using page visits of the website that, for each of a plurality of POIs, has a corresponding web page. As shown in Equation 4, Page views of POI (total) refers to the total number of page views of the respective POI (e.g., such as views of a specific POI page on Wikipedia™, wherein the Wikipedia™ page title refers to the respective POI), Page views of all POIs (total) refers to a sum of all page views of all POIs (e.g., sum of all page views for each of the pages hosted on Wikipedia™ having a page title that refers to a POI), again parameter C may refer to the category coefficient described above, and parameter K again may be a weighting factor (e.g., if relevancy to public interest is deemed lower, K may be ≤1 (e.g., K=0.5)).

$$POI \text{ Score } S4 = C * \left[ \frac{\text{Page views of } POI(\text{total})}{\text{Page views of all } POIs(\text{total})} \right]^K. \quad \text{Equation 4}$$

According to at least one example, any combination of Equations 1-4 may be combined to generate a score, as shown by the example of Equation 5. Still further, other suitable equations may be used in combination with any of Equations 1-5 to adjust POI scores based on relevancy. As stated above, a score may be determined for any suitable quantity of POIs; thereafter, using the respective scores, these POIs may be ranked according to one another. It should be appreciated that in some instances POIs may be grouped together according to category; however, this is not required.

$$\Sigma POI \text{ Score}=S1+S2+S3+S4 \quad \text{Equation 5.}$$

It should be appreciated that millions or more location records may be generated by location content server 14. Further, as web traffic to various sites may vary (e.g., day over day, week over week, etc.), rankings will change. As part of block 1110, location content server 14 repeatedly may add new location records and/or update rankings, metadata, etc. of the respective POIs.

Still further, it should be appreciated that Equations 1-5 were merely examples. Additional criteria may be used to determine a score (e.g., including dwell time per webpage, search engine rankings, new verses returning visitors, etc.). Still further, rankings R (for each location record) may be calculated as often as desirable to be passenger relevant; thus, location content server 14 may store in database(s) 34 massive amounts of information that includes up-to-date ranked location records for large geographic areas. In this manner, location content server 14 may comprise minutely, hourly, daily, etc. trending information that ultimately may be used by a passenger aboard aircraft 12, as described below.

Turning now to block 1120, one or more airline route and destination servers 16 may generate and/or store airline service-region data for one or more predetermined airlines. As discussed above, each airline may generate and/or store for each flight, among other things, information pertaining to origin, departure time, destination, arrival time, route data, planned flight duration, etc. Block 1120 may generate and store all of this information for one or more airlines. Or alternatively, server 16 may store at least a portion of this information (e.g., namely, origin, destination, and route). Similar to block 1110, in block 1120, server 16 may update at least the route information repeatedly (e.g., and sometimes periodically—e.g., such as minutely, hourly, daily, weekly, etc.).

Turning to block 1130, mapping server 18 may receive the global location dataset (via block 1110) and may receive the airline service-region data from an airline route and destination server 16 (block 1120) and may generate an airline-specific dataset. As discussed above (and illustrated by way of example in FIG. 6), mapping server 18 may spatially correlate location records for POIs (LAT, LON) within a predefined geographic region serviced by the airline. In other examples, the mapping server 18 may determine predetermined ranges 48 for each route of an airline and execute a spatial correlation of locations (LAT, LON) for each of the location records to filter the number of location records to only those on or along the routes of the particular airline. Of course, the remaining quantity of location records in the generated airline-specific dataset will vary depending on the number of routes the airline services.

Block 1140 may follow block 1130. In block 1140, mapping server 18 may determine whether additional airline-specific datasets need to be determined (e.g., due to receiving airline service-region data from additional airlines). If so, the process 1100 loops back, obtains additional airline service-region data (from block 1120) and proceeds again to block 1130. If not, process 1100 proceeds to block 1150.

In block 1150, mapping server 18 may receive a request for airline-specific datasets—from one or more provisioning servers 20, and the provisioning server(s) 20 may receive the requested datasets—from the mapping server 18. Thus, block 1150 comprises mapping server 18 delivering updated datasets to respective provisioning servers 20 and provisioning servers 20 delivering the airline-specific datasets to aircraft (e.g., such as aircraft 12).

Block 1150 further may comprise receiving feedback data from aircraft 12, 12', 12", 12''', etc. This feedback data may pertain to additional airline-specific criteria and/or passenger preferences—and ultimately may be used by mapping server 18 and/or location content server 14 as a ranking criteria. Additional airline-specific criteria and passenger preferences (e.g., obtained by passenger input to display 88-1) will be discussed below (in process 1200). It should be appreciated that aircraft passengers' interest regarding various POIs may be weighted more heavily as a ranking factor of the POIs, as these individuals may be more likely to travel to such destinations and is therefore more relevant to their peer passengers (e.g., suggested by the fact that they are presently passengers onboard aircraft 12).

Figure 12:
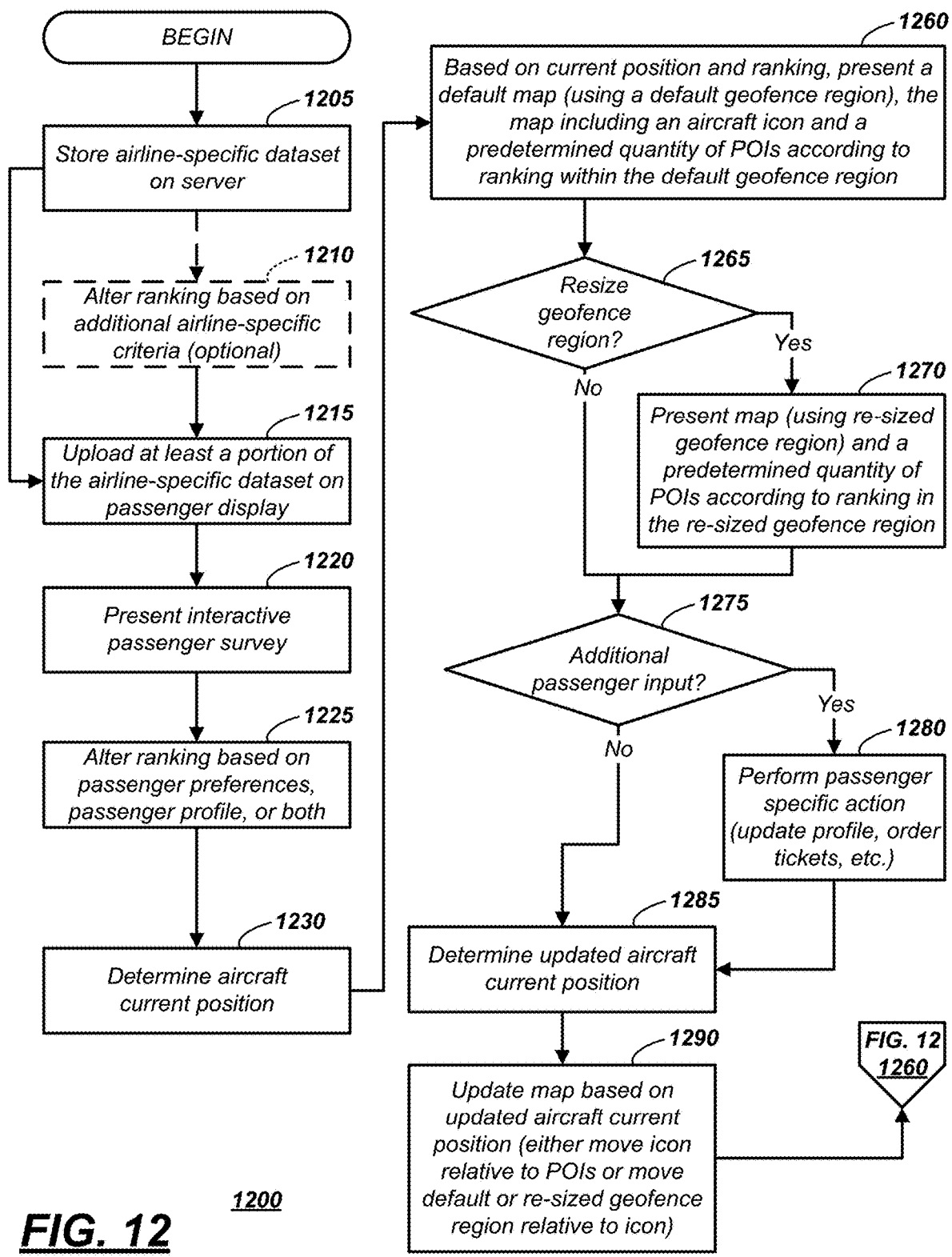
FIG. 12 is a flow diagram illustrating a process of presenting ranked points of interest to a passenger via display while on an aircraft.

Turning now to FIG. 12, a process 1200 is illustrated of presenting ranked POIs to a passenger via display 88-1 while onboard aircraft 12. As the interaction of any passenger with any of displays 88-1, 88-2, ..., 88-m may be similar, this process will be discussed relative to a single passenger and display 88-1. The blocks of process 1200 comprise instructions executable by aircraft server 82 and/or passenger display 88-1.

Process 1200 may begin with block 1205, wherein server 82 receives and stores an airline-specific dataset in memory 102 and/or database 104. Server 82 may receive the airline-specific dataset from provisioning server 20—and via provisioning communication interface 22. According to one aspect, server 82 may receive the airline-specific dataset while grounded (e.g., via a wired connection at an airport terminal). According to another aspect, server 82 may receive the airline-specific dataset or an update thereof wirelessly (e.g., while on the tarmac or in-flight).

Block 1210 follows and is optional. In block 1210, server 82 (via memory 102 and/or database 104) may store additional airline-specific criteria which may be used by server 82 to alter the ranking of the airline-specific dataset received in block 1205. According to one example, the additional airline-specific criteria comprises airline partner information (e.g., associated with commercial enterprises located at or near various POIs within the airline-specific dataset). For example, an airline partner may be a hotel, a restaurant, a rental car agency, or the like nearby a POI (e.g., the POI of a location record having a high ranking). Accordingly, (a) using the additional airline-specific criteria, server 82 may re-rank the airline-specific dataset; and/or (b) using the additional airline-specific criteria, server 82 may filter out one or more of the location records (e.g., removing them from the airline-specific dataset received via the provisioning server 20). Accordingly, block 1210 may be used to further reduce the quantity of location records in the airline-specific dataset (before delivering these location records to the display 88-1). It should be appreciated that each iteration of filtering improves the computing efficiency of the next downstream server/computer; e.g., filtering at block 1130 reduced the quantity of location records which the provisioning server 20 and the aircraft server 82 handle; and filtering at block 1210 further may reduce the quantity of location records which display 88-1 handles.

Following optional block 1210, process 1200 proceeds to optional block 1215, wherein at least a portion of the airline-specific dataset may be uploaded to display 88-1 (and stored in memory 122). In one example, a portion or the entire airline-specific dataset is uploaded to each display 88-1, 88-2, ..., 88-m onboard aircraft 12. For example, if the aircraft 12 is only configured for domestic flights (e.g., within the continental United States) and the airline is an international airline, all location records outside the country (e.g., outside the United States) may be filtered out—e.g., thereby further improving the computational efficiency of the display 88-1. That said, this is not required—e.g., in some examples, it may be desirable to permit passengers to explore location records outside the aircraft's dedicated country of travel (e.g., permit a passenger to identify whether any of the 'top ten U.S. beaches' are also on a 'top ten world list').

As discussed above, block 1215 is optional; e.g., in at least one example, the airline-specific dataset may be stored at the aircraft server 82. In this manner, input from various passengers onboard the aircraft 12 may be centrally gathered and used as a criteria to further rank POIs of interest to the passengers of the particular flight or those which travel the instant route.

According to at least one example, server 82 determines whether a portion of the airline-specific dataset is relevant to provide to displays 88-1 to 88-m—e.g., based on the predefined geographic regions serviced by the airline. Still further, the predetermined range 48 (discussed above) may be determined by aircraft server 82 in at least one example—e.g., and this predetermined range 48 may be relative to the current route or other routes that the airline services.

In block 1220 which follows, a passenger may be presented, via screen 112 of display 88-1, a survey to obtain passenger preferences. The survey may comprise questions or selections to engage passenger interaction and determine demographic data and psychographic data regarding the passenger. Demographic data means information pertaining to at least two of the following: the passenger's gender, the passenger's age, the passenger's marital status, whether the passenger has children, ages of the passenger's children, the passenger's level of education, the passenger's profession or occupation, the passenger's language preference, or the passenger's income range. Psychographic data means information pertaining to at least one of the following: the passenger's spending habits, the passenger's hobbies or interests, or the passenger's opinions.

In block 1225 which follows, computer 110 of display 88-1 may alter the ranking of the airline-specific dataset stored in memory 122. Again, altering the ranking may comprise filtering out location records and/or re-ranking at least some of the location records based on the demographic and/or psychographic data collected in block 1220.

Alternatively, or in combination with altering the ranking based on the passenger survey, in block 1225, computer 110 may alter the ranking based on a passenger profile (e.g., which may be communicated to display 88-1 (e.g., from the passenger's portable wireless device 128) and/or otherwise stored in memory 122).

According to at least one example, block 1225 occurs at aircraft server 82 instead. For example, passenger information collected via the survey or via the passenger's profile can be communicated to and/or stored at the server 82 and there used to re-rank POIs In block 1230—which may occur following or concurrently with any of the previous blocks of process 1200, display 88-1 may determine a current position of aircraft 12. According to one example, determining a current position may include display 88-1 simply receiving a current position from the in-flight aircraft positioning system 86 (e.g., via server 82).

Returning to FIG. 12, block 1260 follows block 1230. In block 1260, based on the current position and based on the ranking as set forth in the airline-specific dataset stored in memory 122, display 88-1 may present to the passenger a default map (using a default geofence region), wherein the map includes an aircraft icon and a predetermined quantity of POI indicators (each associated with a POI), wherein the predetermined quantity of POIs are determined based on their ranking and their location within the default geofence region. As used herein, a map refers to any representation of an area of the earth's surface; e.g., it may be live imagery (e.g., via an aircraft camera (not shown)), it may be a diagrammatical representation (e.g., stored in memory 122), a combination thereof, or the like. As used herein, a geofence region refers to a polygon within the instantaneous screen view at a level of magnification of the map. In at least one example, it is the entire screen view (e.g., a horizontal aspect by vertical aspect); however, other polygonal shapes are possible. Thus, a default geofence region may refer to a predetermined screen view (e.g., stored in memory 122). Thus, in block 1260, computer 110 of display 88-1 determines a predetermined quantity of POIs (e.g., top ten (e.g., according to their rank, per their location records)) for that particular geofence region shown on the map—and presents the POI indicators, within the geofence region, to represent the POIs. As used herein, a POI indicator may be any suitable graphic, icon, symbol, number, letter, etc. used to represent an associated POI. As described more below, if the geofence region is changed (zoomed in or zoomed out), computer 110 may determine to present the same number of POI indicators (the predetermined quantity); however, the POI indicators may represent different POIs as a larger or smaller map view may encompass different POIs per their respective rankings.

In one example, the predetermined quantity of POIs (e.g., the value) may be stored in memory 102 (of aircraft server 82) or memory 122 (of display 88-1). In another example, the predetermined quantity may be selectable by the passenger (e.g., it may be desirable to permit the passenger to select: "Show Top Ten," "Show Top Five," etc.).

According to one example of block 1260, the display 88-1 presents to the passenger a geofence region that includes all or a portion of the current predefined geographic region serviced by the airline. According to another example of block 1260, the display 88-1 presents to the passenger a geofence region that includes the route on which the aircraft 12 is traveling (e.g., including a predetermined range 48 with respect thereto (e.g., which may be below the aircraft 12, immediately in front of the aircraft 12, or any other portion of the route). According to another example of block 1260, the display 88-1 presents to the passenger a geofence region that includes the destination of the route. The destination of the route may be of particular relevance to the passenger—e.g., the passenger may desire to explore POIs once he/she arrives.

Turning to block 1265, computer 110 determines whether the passenger has changed (e.g., resized) the geofence region—e.g., determines whether the passenger zoomed in or zoomed out. Zooming in or zooming out may be accordingly any suitable incremental magnification or de-magnification. When computer 110 determines the geofence region has changed, process 1200 proceeds to block 1270; else the process proceeds to block 1275.

In block 1270, the computer 110 determines the degree of magnification or de-magnification and scales the map accordingly; this in turn, correspondingly may scale the geofence region. In addition—similar to the description of block 1260 above-based on the current position and based on the ranking as set forth in the airline-specific dataset stored in memory 122, computer 110 presents (via screen 112) to the passenger the map (using the resized geofence region), wherein the map includes the aircraft icon and the predetermined quantity of POI indicators, wherein the associated predetermined quantity of POIs are determined based on their ranking and their location within the resized geofence region. Following block 1270, the process proceeds to block 1275.

In block 1275, computer 110 determines whether additional passenger input has been received (e.g., other than resizing the geofence region). If it has, then process 1200 proceeds to block 1280; else, the process proceeds to block 1285.

In block 1280, computer 110 receives and processes this additional passenger input. Non-limiting examples of additional passenger input include updating a stored passenger profile, ordering airline tickets, making reservations, or the like. Ultimately, these types of transactions can be provided to the aircraft server 82 and provisioning server 20 (during flight or when the aircraft 12 lands); sometimes, such transaction may affect ranking of POIs. Following block 1280, the process proceeds to block 1285.

In block 1285, display 88-1 determines the aircraft's current position (e.g., determines an update). According to at least one example, this block may be identical to block 1230 described above; therefore, it will not be re-explained here.

In block 1290, computer 110 updates the map, a position of the aircraft icon with respect to the map, and the predetermined quantity of POI indicators. According to one example, the aircraft icon may appear stationary and the geofence region may appear to move—e.g., corresponding to the heading the aircraft 12 (e.g., if the aircraft 12 is traveling due East, the map may appear to shift rightwardly). According to another example, the geofence region may appear stationary (e.g., at times)—e.g., and the aircraft icon may move relative the geofence region. According to yet another example, the geofence region may be associated with a passenger-selected icon. Regardless of how the map changes due to movement of the aircraft 12, for each updated geofence region (or resized geofence region), the computer 110 may parse the airline-specific dataset and determine the predetermined quantity of top ranked POIs and then present them via the screen 112 (as POI indicators).

Following block 1290, the process may loop back and repeat block 1260 (and the instructional blocks thereafter). This looping back may continue throughout a duration of the flight.

It should be appreciated that processes 1100 (FIG. 11) and 1200 (FIG. 12) may occur at least partially concurrently. For example, location content server 14 may update the location records based on trends while the aircraft 12 is in-flight. This updated global location dataset may be provided to the mapping server 18 which, in turn, may update the airline-specific dataset based on new rankings. Still further, this updated airline-specific dataset may be provided to the provisioning server 20 and ultimately to aircraft server 82 (e.g., via wireless communication system 84) while the aircraft 12 is in-flight. Accordingly, passengers may receive—via their display 88-1—up-to-date POI indicators—presented according to the newest rankings.

Furthermore, passengers survey information (e.g., from block 1220) and/or additional passenger input (e.g., via block 1275, 1280) may be used to improve rankings while in-flight. For example, via the wireless communication system 84, this information (or a derivative thereof) may be transmitted from provisioning server 20 to mapping server 18 and/or location content server 14 in order to alter POI rankings.

According to one example, the responses and input received from passengers onboard a common flight (blocks 1220, 1275, and/or 1280) may be used either by the aircraft server 82 and/or servers 14, 18 to alter ranking.

Thus, there has been described a time-sensitive, data reduction system to improve the passenger experience onboard an aircraft. The system includes a passenger display (onboard the aircraft), wherein via the display, the passenger is presented a number of points of interest (POIs) (e.g., using POI indicators)—the presentation of the particular POIs being based on a ranking of public interest regarding those points and being based on a current geographic position of the aircraft. According to one example, the passenger is presented with highly-ranked POIs; and in at least one example, only a predetermined quantity of the highest ranked points of interest are presented.

In general, the computing systems and/or devices described may employ any of a number of computer operating systems, including, but by no means limited to, App-Link/Smart Device Link middleware, the Microsoft® Automotive operating system, the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OSX and iOS operating systems distributed by Apple Inc. of Cupertino, Calif., the BlackBerry OS distributed by Blackberry, Ltd. of Waterloo, Canada, and the Android operating system developed by Google, Inc. and the Open Handset Alliance. Examples of computing devices include, without limitation, an on-board aircraft computer, a computer workstation, a server, a desktop, notebook, laptop, or handheld computer, or some other computing system and/or device.

Computing devices generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, Java Script, Perl, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random-access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above and are accessed via a network in any one or more of a variety of manners. A file system may be accessible from a computer operating system and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

The processor is implemented via circuits, chips, or other electronic component and may include one or more microcontrollers, one or more field programmable gate arrays (FPGAs), one or more application specific circuits ASICs), one or more digital signal processors (DSPs), one or more customer integrated circuits, etc. The processor may be programmed to process the sensor data.

The memory (or data storage device) is implemented via circuits, chips or other electronic components and can include one or more of read only memory (ROM), random access memory (RAM), flash memory, electrically programmable memory (EPROM), electrically programmable and erasable memory (EEPROM), embedded MultiMediaCard (eMMC), a hard drive, or any volatile or non-volatile media etc. The memory may store data collected from sensors.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

The invention claimed is:

1. A method of presenting, to a passenger on an aircraft, points of interest (POIs), comprising:
   receiving, by a mapping server, a global location dataset comprising a first plurality of location records;
   receiving, by the mapping server, airline service-region data from at least one airline route and destination server;
   generating, by the mapping server, an airline-specific dataset by correlating a plurality of routes of the airline service-region data with points of interest (POIs) of a portion of the global location dataset;
   receiving, by an aircraft server of the aircraft, from the mapping server, the airline-specific dataset, wherein the airline-specific dataset comprises a second plurality of location records, wherein each of the second plurality of location records is included among the first plurality of location records, wherein each of the second plurality of location records comprises a POI and a unique rank, wherein the POI is defined by unique geographic identifier, wherein the second plurality of location records includes at least one location record comprising metadata including one or more internet hyperlinks related to a POI;
   based on results collected via a survey of two or more passengers while in-flight travelling on a same flight on an instant route, generating, while still in-flight, a revised unique rank for at least one of the second plurality of location records, wherein the instant route includes a flight departure location and a flight arrival location;

determining a current position of the aircraft; and based on the current position and based on the revised unique rank of each of the second plurality of location records, controlling, at a passenger display in the aircraft, a presentation of a map and a plurality of POI indicators associated with a highly-ranked subset of the second plurality of location records.

2. The method of claim 1, wherein the highly-ranked subset of the second plurality of location records have a higher rank than a remaining subset of the second plurality of location records.

3. The method of claim 1, wherein the mapping server assigns at least one of the unique rank or the revised unique rank to each of the second plurality of location records.

4. The method of claim 1, wherein each of the second plurality of location records further comprises at least one metadata.

5. The method of claim 4, wherein for each of the second plurality of location records, the respective at least one metadata comprises one of: a title of a POI, a description of a POI, one or more image files related to a POI, a category of a POI, one or more curated social media posts related to a POI, or one or more internet hyperlinks related to a POI.

6. The method of claim 1, wherein determining the current position further comprises: receiving, from an in-flight aircraft positioning system, the current position.

7. The method of claim 1, wherein the revised unique rank is based on demographic data, psychographic data, or both of a plurality of passengers onboard the aircraft.

8. The method of claim 1, further comprising presenting a predetermined quantity of POIs using the plurality of POI indicators.

9. The method of claim 1, further comprising controlling, at the display, the presentation of a geofence region, wherein each of the plurality of POI indicators are located within the geofence region.

10. The method of claim 9, further comprising: receiving a passenger command to resize the geofence region; and in response to the command: determining an updated plurality of location records each having a POI within the resized geofence region; and resizing the geofence region on the display and controlling the presentation of an updated plurality of POI indicators for each of the updated plurality of location records.

11. The method of claim 9, wherein the geofence region is a destination of a current flight of the aircraft.

12. The method of claim 1, further comprising: prior to controlling the presentation, re-ranking the second plurality of location records based on an input to a passenger survey presented via the display.

13. The method of claim 1, wherein the receiving, generating, determining, and controlling steps are executed by the aircraft server.

14. The method of claim 1, wherein the receiving, generating, determining, and controlling steps are executed at least partially by the display.

15. A computer program product, comprising a non-transitory computer-readable medium, comprising a set of instructions executable by an aircraft server to control a presentation via an aircraft passenger display, the instructions comprising, to:

receive, from a mapping server, an airline-specific dataset comprising a plurality of location records, wherein each location record comprises a point of interest (POI) and a unique rank, wherein the POI is defined by unique geographic identifier, wherein the plurality of location records includes at least one location record comprising metadata including one or more internet hyperlinks related to a POI, wherein the mapping server receives a global location dataset and airline service-region data from at least one airline route and destination server and generates the airline-specific dataset by correlating a plurality of routes of the airline service-region data with POIs of a portion of the global location dataset;

based on results collected via a survey of two or more passengers while in-flight travelling on a same flight on an instant route, generate, while still in-flight, a revised unique rank for at least one of the plurality of location records, wherein the instant route includes a flight departure location and a flight arrival location;

determine a current position of the aircraft; and based on the current position and based on the revised unique rank of each of the plurality of location records, control, at the display, the presentation of a map and a plurality of POI indicators associated with a highly-ranked subset of the plurality of location records.

16. The computer program product of claim 15, wherein the highly-ranked subset of the plurality of location records have a higher rank than a remaining subset of the plurality of location records.

17. The computer program product of claim 15, the instructions further comprising, to:

control, at the display, the presentation of a geofence region, wherein each of the plurality of POI indicators are located within the geofence region;

based on the display receiving a passenger command to resize the geofence region, determine an updated plurality of location records each having a POI within the resized geofence region; and control, at the display, the presentation of an updated plurality of POI indicators for each of the updated plurality of location records within the resized geofence region.

18. A method, comprising:

providing for installation, on a mapping server, a first set of computer-executable instructions, comprising to:

receive a global location dataset, comprising a first plurality of location records, wherein each of the first plurality of location records comprises a point of interest (POI) and a unique rank, wherein the POI is defined by unique geographic identifier, wherein the first plurality of location records includes at least one location record comprising metadata including one or more internet hyperlinks related to a POI;

receive airline service-region data from at least one airline route and destination server; and generate an airline-specific dataset by correlating a plurality of routes of the airline service-region data with POIs of a portion of the global location dataset; and providing for installation, on an aircraft server, a second set of computer-executable instructions, comprising to:

receive the airline-specific dataset;

based on results collected via a survey of two or more passengers while in-flight travelling on a same flight on an instant route, generate, while still in-flight, a revised unique rank for at least one of the plurality of location records, wherein the instant route includes a flight departure location and a flight arrival location;

determine a current position of the aircraft; and based on the current position and based on the revised unique rank of each of the plurality of location records, controlling, at an aircraft passenger display, a presentation of a map and a plurality of POI indicators, wherein each of the plurality of POI indicators is associated with a highly-ranked location record.

19. The method of claim 18, further comprising:

providing for installation, on a location content server, a third set of computer-executable instructions, comprising to:

generate the global location dataset by generating the first plurality of location records;

store the global location dataset;

update the global location dataset; and based on the update, electronically send the global location dataset to the mapping server.

20. A system, comprising:

a plurality of displays; and an aircraft server, communicatively linked to the plurality of displays, and programmed to:

receive, from a mapping server, an airline-specific dataset comprising a plurality of location records, wherein each location record comprises a point of interest (POI) and a unique rank, wherein the POI is defined by unique geographic identifier, wherein the plurality of location records includes at least one location record comprising metadata including one or more internet hyperlinks related to a POI, wherein the mapping server receives a global location dataset and airline service-region data from at least one airline route and destination server and generates the airline-specific dataset by correlating a plurality of routes of the airline service-region data with POIs of a portion of the global location dataset;

based on results collected via a survey of two or more passengers while in-flight travelling on a same flight on an instant route, generate, while still in-flight, a revised unique rank for at least one of the plurality of location records, wherein the instant route includes a flight departure location and a flight arrival location;

determine a current position of an aircraft;

based on the current position and based on the revised unique rank of each of the plurality of location records, provide to the plurality of displays, a map and a plurality of POI indicators associated with a highly-ranked subset of the plurality of location records.

* * * * *